United States Patent
Huber et al.

(10) Patent No.: US 9,515,452 B2
(45) Date of Patent: Dec. 6, 2016

(54) COHERENT DYNAMICALLY CONTROLLABLE NARROW BAND LIGHT SOURCE

(71) Applicant: Ludwig-Maximilians-Universität München, München (DE)

(72) Inventors: Robert Alexander Huber, Schnaitsee (DE); Sebastian Karpf, Munich (DE); Matthias Eibl, Witzmannsberg (DE)

(73) Assignee: Ludwig-Maximilians-Universität München, München (DE)

( * ) Notice: Subject to any disclaimer, the term of this patent is extended or adjusted under 35 U.S.C. 154(b) by 0 days.

(21) Appl. No.: 14/890,093

(22) PCT Filed: May 9, 2014

(86) PCT No.: PCT/EP2014/059552
§ 371 (c)(1),
(2) Date: Nov. 9, 2015

(87) PCT Pub. No.: WO2014/180983
PCT Pub. Date: Nov. 13, 2014

(65) Prior Publication Data
US 2016/0118765 A1 Apr. 28, 2016

(30) Foreign Application Priority Data
May 10, 2013 (EP) ..................... 13167333

(51) Int. Cl.
*H01S 3/30* (2006.01)
*H01S 3/108* (2006.01)
(Continued)

(52) U.S. Cl.
CPC ............ *H01S 3/1086* (2013.01); *H01S 3/067* (2013.01); *H01S 3/06733* (2013.01);
(Continued)

(58) Field of Classification Search
CPC H01S 3/06758; H01S 3/06754; H01S 3/1618; H01S 3/108; H01S 3/1086; H01S 3/107; H01S 3/302; H01S 3/30; H01S 3/067
(Continued)

(56) References Cited

U.S. PATENT DOCUMENTS

2003/0043366 A1* 3/2003 Ohta ..................... G01J 11/00
356/121
2006/0198397 A1 9/2006 Korolev et al.
(Continued)

FOREIGN PATENT DOCUMENTS

WO WO-2007/127356 A2 11/2007

OTHER PUBLICATIONS

Rowen, et al. "A combined Yb-Raman fiber amplifier for generating narrow linewidth, high-power pulses in the 1100-1200 nm wavelength range and efficient nonlinear conversion into Yellow," Proc. of SPIE 8601:86011J-1 to 86011J-8 (2013).
(Continued)

*Primary Examiner* — Kinam Park
(74) *Attorney, Agent, or Firm* — Marshall, Gerstein & Borun LLP (57) ABSTRACT

Disclosed herein is a coherent dynamically controllable narrow band light source (10), comprising a first sub-light source (12), said first sub-light source being electrically controllable such as to generate controllable time-dependent intensity patterns of light having a first wavelength, a Raman active medium (30) suitable to cause Raman scattering of light having said first wavelength, a second sub-light source (20) capable of emitting light with a second wavelength, said second wavelength being longer than said first wavelength, and an optical fiber or wave guide, wherein said light emitted by said first and second sub-light sources traverses a length of said optical fiber (30) or wave guide in a
(Continued)

feed-forward configuration to facilitate a non-linear wavelength conversion step involving said Raman-active medium. At least one of said first and second sub-light sources (12, 20) has a coherence length longer than 0.05 mm, preferably longer than 0.5 mm and most preferably longer than 2 mm.

20 Claims, 3 Drawing Sheets

(51) Int. Cl.
    *H01S 3/067*     (2006.01)
    *H01S 3/16*     (2006.01)
    *H01S 3/107*     (2006.01)
    *H01S 3/23*     (2006.01)

(52) U.S. Cl.
    CPC ...... *H01S 3/06754* (2013.01); *H01S 3/06758* (2013.01); *H01S 3/107* (2013.01); *H01S 3/108* (2013.01); *H01S 3/1618* (2013.01); *H01S 3/30* (2013.01); *H01S 3/302* (2013.01); *H01S 3/2375* (2013.01)

(58) Field of Classification Search
    USPC .............................................................. 372/6
    See application file for complete search history.

(56) References Cited

U.S. PATENT DOCUMENTS

2010/0302626 A1* 12/2010 Kakui ..................... H01S 3/302
    359/334
2016/0091429 A1* 3/2016 Huber ...................... G01J 3/44
    356/301

OTHER PUBLICATIONS

Uchida, et al. "Wide-Range All-Optical Wavelength Conversion Using Dual-Wavelength-Pumped Fiber Raman Converter," Journal of Lightwave Technology 16(1):92-99 (1998).
International Search Report and Written Opinion from Application No. PCT/EP2014/059552 dated Jul. 16, 2014.

* cited by examiner

COHERENT DYNAMICALLY CONTROLLABLE NARROW BAND LIGHT SOURCE

CROSS-REFERENCE TO RELATED APPLICATIONS

This is the U.S. national phase of PCT/EP2014/059552, filed May 9, 2014, which claims the benefit of European Patent Application No. 13167333.7, filed May 10, 2013.

FIELD OF THE INVENTION

The present invention is in the field of optics. In particular, the present invention relates to a coherent dynamically controllable narrow band light source involving a Raman-active material.

BACKGROUND OF THE INVENTION

Coherent dynamically controllable narrow band light sources have many applications in medicine, life sciences, spectroscopy and environmental sensing. In many applications, it is preferable if the light source is controllable such that time-dependent intensity patterns, such as pulse patterns can be arbitrarily generated under electronic control. Further, it is often necessary to obtain high output power and in particular, high peak power in case of a pulsed operation. Finally, in many cases it is preferable if the light source can emit light of different wavelengths to make the light source more versatile.

A laser source which meets many of the above requirements is known from US 2006/0198397. This light source comprises a pulsed cascaded Raman laser which includes a pulse light source for generating a pulsed light having an optical spectrum centered at a source wavelength. A non-linear Raman conversion fiber is coupled to the pulse light source. The pulsed light traverses the non-linear Raman conversion fiber and the source power at the source wavelength is converted to an output power of an output signal having an output wavelength longer than the source wavelength due to a cascaded stimulated Raman scattering process.

In this prior art light source, a wavelength conversion is hence achieved by a cascaded stimulated Raman scattering. For this, the pulsed light signal is, after suitable amplification, combined with a Raman seed and introduced in a Raman conversion fiber. The seed-signal has a longer wavelength than the source signal and causes a first Raman scattering due to stimulated Raman emission in the Raman conversion fiber. Depending on the length of the Raman conversion fiber, further cascaded Raman scattering occurs, with correspondingly increasing the wavelength, such that different output wavelengths can be generated.

However, this prior art pulsed cascaded Raman laser also has drawbacks. In particular, one of the drawbacks is that the output bandwidth of the light source is generally limited by the bandwidth of the Stokes band of the Raman-active material. Namely, even if a Raman-active medium is pumped with a narrow band laser, the Raman scattered light generally has a certain bandwidth that reflects the width of the Stokes band of the Raman-active medium. With simulated Raman emission, a narrow band scattered light can be obtained if the probe light is of narrow width. However, in a cascaded Raman laser as described in the above prior art, stimulated Raman emission serves as the pump light for further Raman scattering, and this further Raman scattering is no longer stimulated but exhibits the emission bandwidth reflecting the entire Stokes band. For example, if an optical fiber is used as the Raman-active medium, a typical frequency shift in a certain range of 13 to 15 THz is obtained. Further, in the above-mentioned prior art, the light source lacks of flexibility in the time control of the light source.

SUMMARY OF THE INVENTION

It is thus one object underlying the invention to provide a coherent dynamically controllable light source allowing for a non-linear frequency conversion but at the same time obtaining output light having a narrow bandwidth.

It is a further object to provide a coherent light source allowing for improved time control of the light output pattern.

The first object is solved by a light source according to claim 1 and a method according to claim 23. Preferable embodiments are defined in the dependent claims.

According to a first aspect of the invention, the light source comprises a first sub-light source, said first sub-light source being electrically controllable such as to generate controllable time-dependent intensity patterns of light having a first wavelength, a Raman-active medium suitable to cause Raman scattering of light having said first wavelength and exhibiting a wavelength shift within a range of Stokes shifts, a second sub-light source capable of emitting light with a second wavelength, said second wavelength being longer than said first wavelength and differing from said first wavelength by a wavelength shift within said range of Stokes shifts, and an optical fiber or wave guide, wherein said light emitted by said first and second sub-light sources traverses a length of said optical fiber or wave guide in a feed-forward configuration to facilitate a non-linear wavelength conversion step involving said Raman-active medium. Herein, at least one of said first and second sub-light sources has a coherence length longer than 0.05 mm, preferably longer than 0.5 mm and most preferably longer than 2 mm.

According to this aspect of the invention, first and second sub-light sources and a Raman-active medium are provided in a manner similar to the prior art discussed above. In the invention, the first sub-light source is electronically controllable such as to generate controllable time-dependent intensity patterns. Further, the light source comprises an optical fiber or wave guide in which the light emitted by the first and second sub-light sources traverses the length of said optical fiber in a feed-forward configuration to facilitate a non-linear wavelength conversion step involving the Raman-active medium. Herein, the "feed-forward configuration" can be a 1-4 pass feed-forward configuration. The "Feed-forward configuration" distinguishes the light source from a resonator-based light source. A feed-forward or "resonator-less" light source allows for flexible and fast electronic control of the intensity pattern.

Further, according to this aspect of the invention, at least one, preferably both of said first and second sub-light sources have a minimum coherence length. In particular, one or both of the first and second sub-light sources has a coherence length longer than 0.05 mm, preferably longer than 0.5 mm and most preferably longer than 2 mm.

The inventors have found out that surprisingly, if the first and/or second light sources have a sufficient coherence length, higher numbers of Raman shifts can be obtained while keeping the band width of the light signal below the width normally occurring due to spontaneous Raman emission in the Raman active medium. In fact, it is seen that consecutive Raman-shifted light signals can be obtained having a much narrower bandwidth than what would be expected from spontaneous Raman emission and which is shifted in frequency by multiples of the frequency difference between the first and second wavelength light. While a narrow bandwidth would be understandable for the first order Raman shifted light matching the second wavelength light due to the stimulated emission, for the higher order wavelength shifted light this is entirely unexpected, as there is no appropriate wavelength light source that could cause stimulated Raman scattering based on the first or higher order wavelength shifted light. Instead, for the "second or higher orders" of shifted light, it would appear that only vacuum fluctuations would be available for stimulating Raman emission, or in other words, a spontaneous Raman emission type process is expected to occur. Herein, the "order" of a shift shall indicate how many combined Raman processes are involved. For example, a third order shift would lead to a wavelength shift that corresponds to three times the frequency difference between the first and the second wavelength light. In the present disclosure, reference is made to "combined" Raman processes rather than "cascaded" Raman processes for reasons explained in more detail below.

Accordingly, it was surprisingly found that even for the "second order" shift a narrow Raman emission can be obtained that is much narrower than what would be expected from spontaneous Raman emission and that is shifted precisely by the frequency difference between the first and the second wavelength light. It thus appears that even for the generation of the second and the higher order wavelength shifts, the first wavelength light is involved in the combined Raman shift process. It is currently believed by the inventors that the underlying process is a four-way mixing type process which combines two Raman processes. This is why herein the term of "combined Raman processes" is used rather than cascaded processes, because the term "cascaded" relates to independent processes occurring one after the other. While a full understanding of the underlying process is still under investigation, the inventors have observed that this effect can be obtained provided that the coherence length of the first and/or second light sources is above the aforementioned lower boundary.

In a preferred embodiment, the wavelength converted light resulting from the wavelength conversion step has likewise a coherence length longer than 0.05 mm, preferably longer than 0.5 mm and most preferably longer than 2 mm.

According to a second aspect of the invention, a coherent dynamically controllable narrow light source is provided, comprising
 a first sub-light source, said first sub-light source being a light source operating substantially in continuous wave mode,
 an electronically controllable modulator for modulating the light emitted from the first sub-light source such as to generate controllable time-dependent intensity patterns,
 a fiber amplifier for amplifying the modulated light generated by said first sub-light source and modulated by means of said modulator,
 a Raman active medium suitable to cause Raman scattering of light having said first wavelength and exhibiting a wavelength shift within a range of Stokes shifts,
 a second sub-light source capable of emitting light with a second wavelength, said second wavelength being longer than said first wavelength and differing from said first wavelength by a wavelength shift within said range of Stokes shifts, wherein said second sub-light source operates substantially in continuous wave mode,
 wherein light generated by said first sub-light source and modulated by said modulator, and light generated by said second sub-light source are fiber-coupled into said Raman active medium.

This design allows for a very flexible control of the output light pattern. In particular, the modulator may allow modulating the substantially continuous wave light from the first sub-light source with a modulation frequency of more than 100 kHz, preferably more than 500 kHz and most preferably more than 1 MHz.

Preferred embodiments of the light sources according to either one of the first or second aspects of the invention are discussed in the following.

In a preferred embodiment, the light source further comprises a modulator for modulating light generated by the first or second sub-light source.

Herein, the modulator may be one of
 an electro-optical modulator,
 an acoustic-optical modulator, or
 a swept Fabry-Pérot filter.

Among these modulators, an electro-optical modulator is particularly preferred because it allows generating almost arbitrary intensity patterns in a simple way, for example, under the control of a programmable function generator and/or a triggerable pulse generator. In particular, the modulator can be electronically controlled to generate one or more of:
 a CW light signal
 a periodic sinusoidal modulation or
 a light pulse pattern.

In a preferred embodiment, the pulse lengths of the light pulse pattern are at least 10 ps, preferably at least 20 ps and most preferably at least 30 ps. In addition or alternatively, the pulse length may be 50 ns or below, preferably 10 ns or below and most preferably 2.5 ns or below.

With this range of pulses, the light source can find use in many applications, including, but not limited thereto, stimulated Raman emission or photo-acoustic applications.

In a preferred embodiment, the modulator can be electronically controlled to configure the time delay between each two consecutive pulses with a mean repetition rate of 10 kHz or more, preferably 100 kHz or more, and most preferably 1 MHz or more.

Preferably, at least one of the first and second sub-light sources is a laser light source, and in particular a semi-conductor laser light source, preferably a semi-conductor laser diode.

The first sub-light source may have a wavelength in the range of 950 nm to 1200 nm, preferably in the range of 1000 to 1150 nm.

In a preferred embodiment, the first sub-light source has a wavelength of 1044 nm to 1084 nm, for optimum comparability with YAG laser optics.

In an alternative preferred embodiment, the wavelength of the first sub-light source may be in the range of 1010 to 1050 nm, for optimum amplification using Ytterbium as a gain medium.

In a yet further preferred embodiment, the wavelength of the first light source is between 950 nm and 1050 nm for enabling a maximum Raman shift.

Preferably, the wavelength of the second sub-light source is red-shifted compared to the wavelength of the first light source by 300 to 700 $cm^{-1}$.

In a further preferred embodiment, the first sub-light source may have a wavelength of 1450 to 1700 nm, preferably of 1480 to 1650 nm.

In a preferred embodiment at least one of the first and second sub-light sources has a spectral width narrower than 1 nm, preferably narrower than 0.1 nm.

In a preferred embodiment, the light source is operable with a duty cycle of less than 10%, preferably less than 1% and most preferably less than 0.1%. The instantaneous power may be more than 10 W, preferably more than 100 W, more preferably more than 300 W and most preferably more than 1 kW.

In a preferred embodiment, the light source comprises at least one optical amplifier. The optical amplifier may for example be used to amplify the light signal generated by the first sub-light source and modulated by the aforementioned modulator.

In a preferred embodiment, the at least one optical amplifier comprises a gain medium and a third sub-light source for pumping said gain medium. Herein, the gain medium is preferably a rare-earth doped optical fiber, wherein said rare-earth is preferably one or more of Ytterbium, Erbium, Thulium, Holmium and Praseodymium.

A number of this type of optical amplifiers can be arranged in series to provide consecutive amplification stages. Such amplifiers are also referred to as master oscillator power amplifiers (MOPAs) in the art.

In a particularly preferred embodiment, at least one of the optical amplifiers comprises a double-clad fiber having a core portion formed by a rare-earth doped fiber and a cladding layer for guiding pump light. Herein, the core portion fiber is preferably a single-mode fiber and the cladding layer is providing multi-mode pump light. In this embodiment, the core portion carries the signal that is to be amplified only, while the pump light is guided in the cladding layer. Accordingly, the entire light capacity of the fiber can be dedicated to the light signal that is to be amplified. This compares favorably with applications where both, the pump light and the light signal to be amplified are confined to the same fiber. Further, since the cladding layer allows guiding multi-mode pump light, the intensity of the pump light can be comparatively high, thereby leading to a high amplification gain.

Preferably, the pump light is fed into the cladding layer in a direction opposite to that of the light propagating in the core portion. This avoids that the amplified light signal is contaminated with pump light.

In a preferred embodiment, the light source comprises two or more optical amplifiers, wherein between two optical amplifiers, a filter, in particular a laser line filter, is provided for filtering an amplified stimulated emission background. In this way the signal-to-noise ratio can be efficiently increased. In a preferred embodiment, the Raman-active medium is formed by an optical fiber, in particular a silica fiber.

The number of combined Raman shifts will depend on the length of the fiber. Preferably, the fiber length is selected such as to allow for at least two consecutive Raman wavelength shifts.

In a preferred embodiment, the non-linear wavelength conversion step is carried out in an optical amplifier, and in particular in the last optical amplification stage of the light source. Preferably, the light signal, i.e. the signal generated by the second sub-light source is introduced into the optical amplifier prior to or during amplification in the amplifier where the wavelength conversion step takes place. Namely, as long as the intensity of the original light signal generated by the first sub-light source and pre-amplified by one or more of the aforementioned amplifiers (i.e. the "first light signal") is still low, the Raman gain is made negligible, such that bringing in the light signal as a Raman-seed signal does not have any significant influence on the light. Only when the first wavelength light receives a strong amplification, the broadband Raman gain is seeded by the narrow second wavelength light (second light signal) acting as the Raman seed. In total, this leads to a narrow line width at the shifted wavelength, where the other properties of the initial signal generated by the first sub-light source can largely be conserved. In particular, this allows avoiding a parasitic Raman background in the spectrum.

In one embodiment, the second sub-light source may be a tunable light source, which in turn allows choosing the wavelengths obtainable by the wavelength conversion. For this, for example, a grating based tunable laser or a Fabry-Pérot tunable laser can be used. While in case of the combined Raman shifts several frequencies of output light are usually generated, the selection of the suitable wavelengths can be made using suitable filters at the location of use of the light. In some embodiments, however, the selection of the appropriate wavelengths can be achieved using optical filters in the fiber setup.

In some embodiments, the electro-optical modulator has a switch voltage of <40 V, preferably <10 V and most preferably <5.6 V.

The fibers used in the light source may be polarization-conserving fibers. In particular, the fibers may be single-mode fibers of the group SMF28 or its equivalents or Hi1060 or its equivalents.

If a double cladding fiber is used for one of the optical amplifiers, the core diameter may be at least 3 μm, preferably at least 5 μm, and more preferably at least 6 μm. In addition or alternatively, the core diameter may be 18 μm or less, preferably 12 μm or less and more preferably 9 μm or less. In practice, the core diameter of the double cladding fiber may correspond to that of the single mode fibers used in the setup, for a better overlap of the modes.

In a preferred embodiment, the pulse length generated by a first sub-light source can be variably adjusted. In the preferred embodiment, the light source comprises one or more optical isolators. In a preferred embodiment, the first and second sub-light sources are synchronized with each other. Preferably, this synchronization is established electronically and in particular based on sharing common electrical signals or phase-locking electrical signals involved in the time control of the respective sub-light source.

In a preferred embodiment, the first sub-light source is capable of generating pulse patterns having pulses that are spaced in time with a time distance of less than 10 ns, preferably less than 2 ns and particularly preferably less than 1 ns. This can be used to suppress stimulated Brioullin scattering.

The invention further relates to a method for generating coherent narrow band light comprising the following steps:

generating light having a first wavelength using a first sub-light source, generating light having a second wavelength using a second sub-light source, said second wavelength being longer than said first wavelength, superposing said first and second wavelength light in an optical fiber or waveguide, thereby facilitating a non-linear wavelength conversion step involving a Raman-active medium, wherein at least one of said first and second sub-light sources has a coherence length longer than 0.05 mm, preferably longer than 0.5 mm and most preferably longer than 2 mm.

DESCRIPTION OF THE PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is intended thereby, such alterations and further modifications in the illustrated device and method and such further applications of the principles of the invention as illustrated therein being contemplated therein as would normally occur now or in the future to one skilled in the art to which the invention relates.

Figure 1:
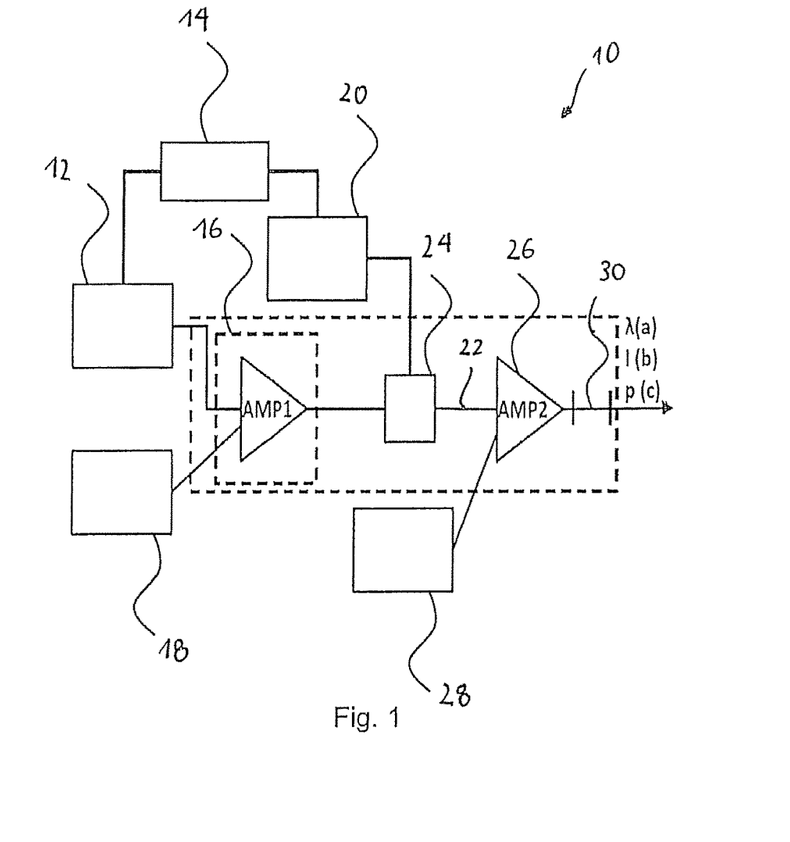
FIG. 1 is a schematic overview of a light source according to an embodiment of the invention.

With reference to FIG. 1, a light source according to an embodiment of the invention is schematically shown.

In FIG. 1, a narrowband laser light source 12 resembling a first sub-light source generates an initial light signal, under the control of an electronic control unit 14. More precisely, the control unit 14 controls a suitable modulator (not shown) such as to arbitrarily modulate the amplitude and/or phase of the first sub-light source 12. The modulated light signal of the first sub-light source 12 is then amplified in an amplifier 16 having a gain medium that is pumped by a third sub-light source 18. While only one amplifier 16 is shown in FIG. 1, a plurality of amplifiers 16 can be arranged in series to thereby amplify the modulated output signal of the first sub-light source 12.

With further reference to FIG. 1, the modulated and amplified output signal can be shifted in wavelength using stimulated Raman emission. For this, a second sub-light source 20 generates a Raman shift seed-signal that is also fed into a Raman active medium, such as an optical fiber 22, 30. For this purpose, in the example of FIG. 1 a wavelength division multiplexer 24 is used. The Raman shift seed-signal generated by the second sub-light source 20 differs from the wavelength of the initial light signal generated by the first sub-light source 12 by a Stokes band of a Raman active medium, i.e. of the fiber 22, 30. The purpose of the Raman shift seed-signal is to induce stimulated Raman emission in a portion of the fiber 22, 30 to thereby generate a Raman-shifted output signal. For example, if the fiber 22 is a silica fiber of the type often used in telecommunication applications, a very intense signal can act as a pump source for a spontaneous Raman effect in the fiber 22. The strong narrow band pump signal would then usually be shifted towards a broad spectrum having a maximum intensity shift by 13 to 15 THz with respect to the pump signal. Using the Raman shift seed-signal generated by the second sub-light source 20, however, a stimulated emission is caused, and the broad spectrum known from the spontaneous Raman effect will be reduced to a narrow peak having the spectral properties of the Raman seed-signal.

Note that stimulated Raman scattering in an optical fiber only occurs at a significant amount when high powers are applied. For this, a second amplifier 26 is provided which likewise comprises a gain medium and is pumped by a forth sub-light source 28. While the fibers 22, 30 and the second amplifier 26 are shown as separate objects in the schematic view of FIG. 1, amplification and Raman shift may at least in part take place in one and the same fiber. The inventors have found out that it is advantageous to actually feed in the Raman shift seed-signal prior to the last amplification stage 26. Namely, as long as the intensity of the original light signal as generated by the first sub-light source 12 and preamplified by the amplifier 16 is still low, the Raman gain is negligible, such that bringing in the seed-signal does not have any significant impact on the light. Only if the original light receives a strong amplification in the second amplifier 26, the broad band Raman gain will be seeded by the narrow Raman seed. In total this leads to a narrow line width at the shifted wavelength, wherein the pulse properties of the initial signal generated by the first sub-light source 12 can largely be conserved. In particular, this allows avoiding a parasitic Raman background in the spectrum.

With further reference to FIG. 1, downstream of the second amplifier 26, an optical fiber 30 is shown which may act as the Raman active medium for further intended wavelength shifts. Based on the length of the optical fiber 30, the Raman shift can be repeated in the sense that two or more Raman shifts may occur in sequence, thereby allowing for another one or even more wavelength shifts. The optical fiber 30 can also be split into different fibers of different lengths to generate outputs with different wavelength shifts due to a different number of consecutive Raman shifts.

In fact, the inventors noticed that in the fiber 30, the Raman shifts are not simply "repeated" in the sense of a cascaded Raman scattering process where the individual Raman processes are unrelated to each other. Instead, provided that the coherence lengths of the first and/or second light sources 12, 20 are sufficiently long, it is seen that the first sub-light source light also plays a role in the generation of "second order" Raman shifted light, i.e. the light that is shifted towards longer wavelengths as compared to the second wavelength by a wavelength corresponding to the frequency difference of the first and second light sources. This is evidenced by the fact that the frequency shift between the second order Raman shifted light and the first order Raman shifted light matches precisely the frequency difference between the first and second light sources, and that the second order Raman shifted light has a bandwidth that is much narrower than the ordinary bandwidth expected from spontaneous Raman emission. Accordingly, by providing for sufficient coherence length in the first and/or second light sources 12, 20 this effect can be used to generate narrowband shifted output light that is considerably narrower than the inherent Stokes band of a fiber that would in fact lead to frequency shifts in a rather broad range of 13 to 15 THz.

The second sub-light source 20 may be a tunable laser light source, for example a grating based tunable light source or a Fabry-Pérot tunable laser. One or all of the sub-light sources 12, 18, 20, 28 may have a polarization analyzer or other polarization control means. This is particularly important for the second sub-light source 20, because the Raman gain strongly depends on the polarization of pump and Stokes light. It is maximal for parallel and minimal for orthogonal polarization. Since there are birefringence fracturations in the fiber, the polarization of the Stokes and pump light will change for each wavelength differently during propagation in the fiber. This will lead to different gains if different stress or strain is applied to the fiber or if temperature changes are present, as these effects have an impact on the birefringence of the fiber. To be able to optimize the polarization in terms of the above mentioned impacts, a polarization analyzer or polarization controller is preferably used in the generation of the Raman shift seed light.

The wavelength of the first sub-light source 12 is preferably between 1044 and 1084 nm, preferably between 1054 and 1074 nm, because this allows for a compatibility with most YAG laser optics. In an alternative embodiment, the output wavelength of the first sub-light source 12 is between 1010 and 1050 nm, more preferably between 1020 and 1040 nm, because this allows for a maximum amplification using Ytterbium as the gain medium, which is a preferred material for this purpose. In yet an alternative embodiment, the wavelength of the first sub-light source 12 is in the range of 950 to 1050 nm, preferably 980 to 1020 nm, to allow for a maximum Raman shift.

Preferably, the wavelength of the Raman shift seed signal is redshifted as compared to the wavelength of the first sub-light source 12 by 300 to 700 $cm^{-1}$, preferably by 400 to 600 $cm^{-1}$.

Figure 2:
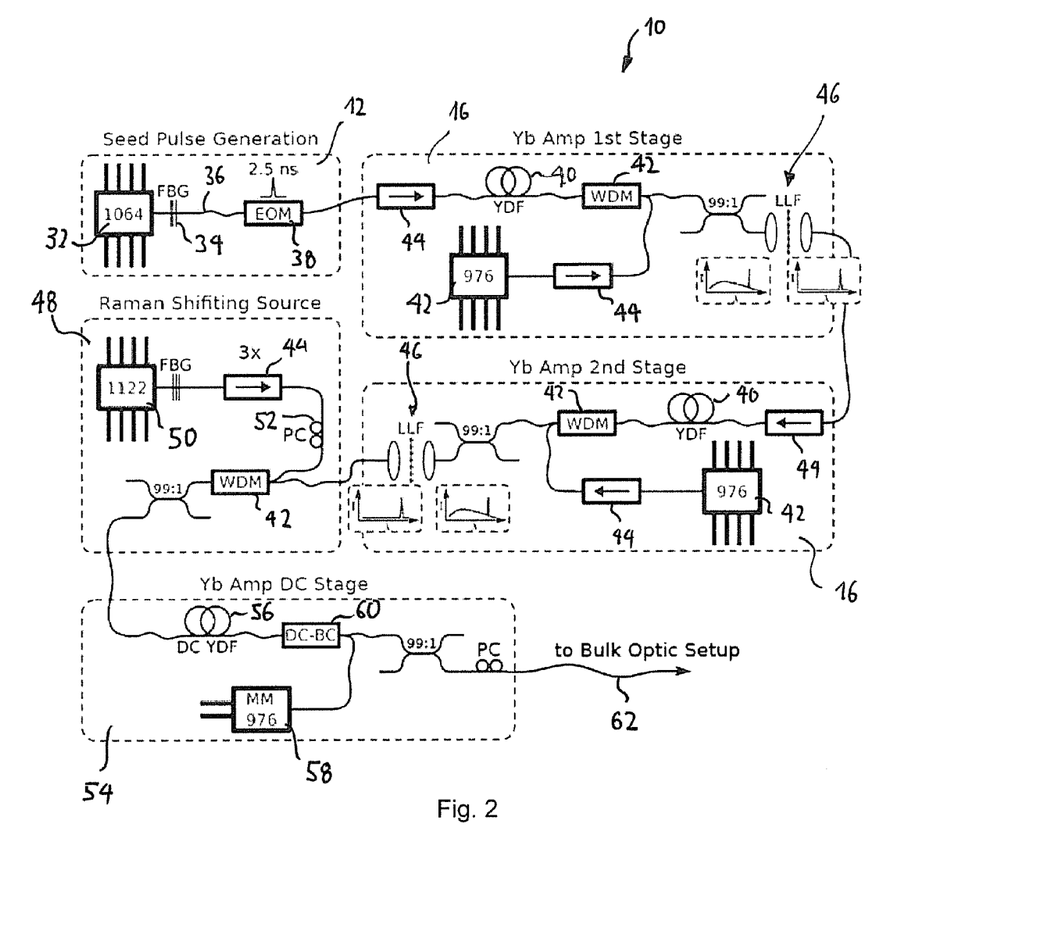
FIG. 2 is a diagram showing the specific embodiment of the light source of FIG. 1, and FIGS. 3 and 4 are spectra obtained with the light source of FIG. 2, showing narrow bandwidth wavelength conversion peaks.

With reference to FIG. 2, a specific embodiment of the light source 10 according to FIG. 1 is shown. Corresponding components are designated with identical reference signs.

As shown in Fig., a first sub-light source 12 is provided for generating a seed light pulse. The first sub-light source 12 comprises a 1064 nm laser diode 32 with a fiber Bragg grating 34. The laser diode 32 is connected via a polarization maintaining fiber 36 to an electro optical modulator 38 which modulates the light signal from the laser diode 32 to generate pulses with a duration of 2.5 ns at desired timing, under control of a control unit like the control unit 14 of FIG. 1, which is not shown in FIG. 2. Actually, the electro optical modulator 38 would allow for shorter light pulses, as short as 100 ps only if desired.

Downstream of the first sub-light source 12, a first amplification stage 16 is provided. The first amplification stage 16 comprises an Ytterbium doped fiber 40 as a gain material which is pumped by a 976 nm laser diode 42. The pump light is coupled into the Ytterbium doped fiber 40 by means of a wave division multiplexer (WDM) 42. In the optical fibers, isolators 44 are further provided. The length of the Ytterbium doped optical fiber 40 is chosen to yield a good compromise between gain and amplified stimulated emission (ASE). A preferable length of the Ytterbium doped fiber 40 is between 1.5 and 2.5 meters.

The thus amplified light signal is fed through a laser line filter 46 into a second amplification stage 16 which is generally the same as the first amplification stage 16 and therefore does not need to be described again.

The laser line filter 46 serves to filter the ASE background, as is apparent from the illustrative boxes shown in FIG. 2. Instead of laser line filters, other filter designs can be used.

A Raman shifting source 48 is provided for generating a Raman shift seed signal. The Raman shifting source corresponds to the second sub-light source 20 in FIG. 1. The Raman shifting source 48 comprises a 1122 nm laser diode 50 which may be selectively turned on or off under control of a control unit (not shown), depending on whether a Raman shift of the output light is intended or not. Light from the 1122 nm laser diode 50 is fed through a polarization controller 52 allowing adjusting the polarization of the Raman shift seed signal such as to cause an optimum stimulated Raman emission. The polarization adjusted light from the 1122 nm light source 50 is coupled into the 1064 nm light pulse signal that was shaped by the electro optical modulator 38 and amplified in the two amplification stages 16 via another WDM 42.

Both, the 1122 nm Raman shift seed signal and the pre-amplified 1064 nm pulse are fed into a final amplification stage 54 which is also referred to as a double clad (DC) amplification stage schematically shown in FIG. 2. A double clad fiber usually consists of three layers of material, namely a core, a first cladding and a second cladding. With a decreasing refractive index from core to second cladding, light can be guided in the core and in the first cladding, respectively.

The final amplification stage 54 comprises a double cladding fiber 56 having a single-mode Ytterbium doped core and a first cladding, to which 976 nm pump light generated by a 976 nm multimode pump source 58 is fed via a double clad-beam combiner 60.

Since multi-mode pump light is fed into the first cladding of the double cladding fiber 56, a very strong amplification can be generated. Namely, using a multimode diode 58 higher intensities can be achieved as compared to a single mode diode. Also, while in the first and second amplification stages 16 the single-mode Ytterbium doped fibers 40 need to carry both, the signal as well as the pump light, in the double clad fiber 56 of the final amplification stage 54, the Ytterbium doped core fiber is reserved for the signal only, such that the full capacity thereof can be used for the signal. As seen in FIG. 2, the multimode pump light is directed in opposite direction to the propagation direction of the signal within the core of the double clad fiber 56 such that the pump light will not contaminate the amplified 1064 nm light.

When the laser diode 50 of the Raman shifting source 48 is turned off, the final amplification stage 54 simply amplifies the 1064 nm pulse. However, if the Raman shifting source 50 is turned on, the light of the Raman shifting source 48 acts as a stimulated Raman emission seed signal within a fiber 62 leading to a bulk optic setup or some sample location or the like (not shown in FIG. 2), where the light generated by the light source 10 is to be employed.

Figure 3:
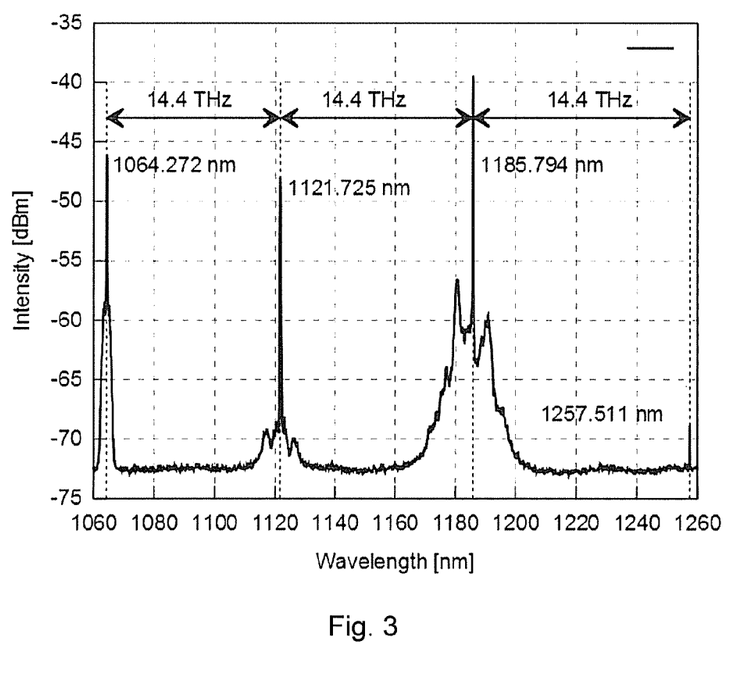

FIG. 3 shows the spectrum of the light obtained in the fiber 62 of FIG. 2, if the Raman shifting source 48 is turned on. As is shown in FIG. 3, a spectrally narrow 1064 nm (1064.272 nm) (i.e. non-shifted) spectral peak is obtained, as is to be expected. Further, a peak at about 1122 nm (1121.725 nm) is observed which is due to the stimulated Raman emission with a Raman seed signal of this wavelength. The frequency shift between these two signals is 14.4 THz, as is also indicated in FIG. 3, which corresponds to a Stokes band of the silica material constituting the fiber 62. Further note that an additional peak is present at about 1185 nm (1185.794 nm), i.e. at a further frequency shift of 14.4 THz. This peak is again very narrow, although no corresponding Raman seed signal is applied. A fourth, but smaller peak is seen at about 1257 nm (1257.511 nm). Further, FIG. 4 shows a close-up of the spectrum of the non-shifted peak at 1064 nm and the Raman shifted peak at 1122 nm.

It is a very surprising result that also the second order Raman shifted light at 1185 nm has a narrow peak that cannot be explained by independent "cascaded" Raman processes. As explained in the introductory portion, this effect is attributed to the coherence length of the light from the first and/or second light sources 12, 20, allowing for four-wave-mixing type processes.

Figure 4:
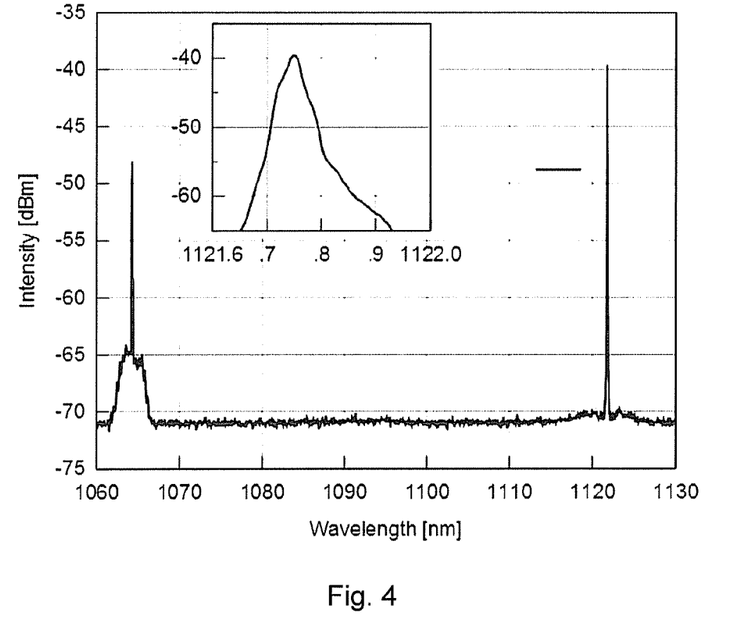

As is seen from FIGS. 3 and 4, using the stimulated Raman emission, narrow wavelength signals at different wavelengths can be generated, wherein the frequency shift depends on the Raman shift seed signal and can therefore to some extent be adjusted by the design. It is also found that the timing and the pulse shape of the amplified and Raman shifted signal are still very similar to the original pulse prior to amplification, i.e. as generated by the first sub-light source 12 and modulated by the electro optical modulator 38. Accordingly, the light source 10 allows generating light signals of practically arbitrary shape, owing to the modulation by the electro optical modulator 38, with very strong amplification as effected by the first and second amplification stages 16 and the final amplification stage 54, and with an optional frequency shift by one or more combined Raman shifts.

This light source 10 as shown in FIG. 2 is hence ideally suited for many applications, because it allows
generating short light pulses at precisely electronically configurable, programmable timings,
generating very high peak powers of several kilowatts and for optional frequency shifts while maintaining a narrow band width.

As was explained with reference to FIG. 1 above, the number of repeated Raman shifts arising will depend on the length of the fiber 62. Accordingly, the desired wavelength shift can be controlled by the length of the fiber 62. In some embodiments, fibers 62 with different lengths can be attached, giving rise to the desired number of repeated Raman shifts, or, in other words, the desired output wavelength. It is also possible to permanently attach a short fiber 62 (for 1122 nm light) and a longer fiber 62 (for 1185 nm light) using a suitable coupler, and yet longer fibers 62 for even longer wavelengths.

In one embodiment, the amplification and Raman shift occur simultaneously in the same optical fiber. In one embodiment, a tunable light source is used for generating the Raman shift seed signal, which in turn allows choosing the wavelength obtainable by the combined stimulated Raman shifts. For this, for example, a grating based tunable laser or a Fabry-Pérot tunable laser can be used. While in case of the repeated Raman shift several frequencies of output light are usually generated, the selection of these suitable wavelengths can be chosen using suitable filters at the location of use of the output light. In some embodiments, the selection of the appropriate wavelengths can be achieved using a fiber Bragg grating which is connected via a circulator. It is, however, also possible to select the wavelengths using optical filters in the fiber setup.

In some embodiments, the modulator 38 is an electro optical modulator having a switch voltage of <40 Volt, preferably <10 Volt and most preferably <5.6 Volt.

In some embodiments, the seed signal is modulated, by means of the EOM 38, with a frequency of more than 200 MHz, preferably more than 500 MHz, more preferably more than 1 GHz, more than 2.5 GHz or more than 10 GHz, with regard to either one of amplitude or phase.

Moreover, some of the fibers used in the light source 10 may be polarization conserving fibers. In particular, the fibers may be single-mode fibers of the group SMF28 or its equivalents or Hi1060 or its equivalents.

In an alternative embodiment, the first sub-light source 12, i.e. the "seed light source", can be made tunable. In particular, the first sub-light source 12 could be a rapidly tunable light source or swept light source, such as an FDML laser that can be used together with a modulator such as the EOM 38 shown in FIG. 2. However, other tunable light sources can likewise be used for the seed pulse generation.

Further, instead of the laser line filters 46 shown in FIG. 2, which are used for suppressing the spectral background caused by the rare earth doped fiber amplifiers, a combination of an optical circulator and a fiber Bragg grating may be used, such that a completely fiber-based setup can be achieved. In addition or alternatively, narrowband wavelength division multiplexers, fiber Fabry-Pérot filters or fiber-based spectral filter elements can be employed.

The embodiments described above and the accompanying figures merely serve to illustrate the system of the present invention, and should not be taken to indicate any limitation thereof. The scope of the patent is solely determined by the following claims.

LIST OF REFERENCE SIGNS 10 light source
12 first sub-light source
14 control unit
16 amplifier
18 third sub-light source
20 second sub-light source
22 optical fiber
24 wavelength division multiplexer
26 second amplifier
28 fourth sub-light source
30 optical fiber
32 laser diode
34 fiber Bragg grating
36 polarization maintaining fiber
38 electro-optical modulator
40 Ytterbium-doped fiber
42 laser diode
44 optical isolator
46 laser line filter
48 Raman shifting source
50 laser diode
52 polarization controller
54 final amplification stage
56 double-cladding fiber
58 multi-mode pump source
60 double-clad-fiber beam combiner
62 optical fiber

The invention claimed is:

1. A coherent dynamically controllable narrow band light source, comprising:
a first sub-light source, said first sub-light source being electrically controllable such as to generate controllable time-dependent intensity patterns of light having a first wavelength;
a Raman active medium suitable to cause Raman scattering of light having said first wavelength;
a second sub-light source capable of emitting light with a second wavelength, said second wavelength being longer than said first wavelength; and
an optical fiber or waveguide, wherein said light emitted by said first and second sub-light sources traverses a length of said optical fiber or waveguide in a feed-forward configuration to facilitate a non-linear wavelength conversion step involving said Raman-active medium,
wherein at least one of said first and second sub-light sources has a coherence length longer than 0.5 mm, wherein the length of said fiber or waveguide is selected such as to allow for at least two consecutive Raman wavelength shifts, and wherein the frequency shift associated with the at least two Raman shifts is a corresponding multiple of the difference between said second and first wavelengths.

2. The light source of claim 1, wherein the wavelength converted light resulting from said wavelength conversion step has a coherence length longer than 0.05 mm.

3. The light source of claim 1, further comprising a modulator for modulating light generated by the first or second sub-light source, wherein said modulator is one of
an electro-optical modulator,
an acoustic-optical modulator, or
a swept Fabry-Perot filter,
wherein said modulator can be electronically controlled to generate one or more of:
a CW light signal,
a periodic sinusoidal modulation or
a light pulse pattern.

4. The light source of claim 3, wherein the pulse lengths of the light pulse pattern are at least 10 ps and 50 ns or below.

5. The light source of claim 3, wherein the modulator can be electronically controlled to configure the time delay between each two consecutive pulses with a mean repetition rate of 10 kHz or more.

6. The light source of claim 1, wherein at least one of the first and second sub-light sources is a semi-conductor laser light source.

7. The light source of claim 1, wherein at least one of the first and second sub-light sources has a spectral width narrower than 1 nm.

8. The light source of claim 1, wherein said light source is operable with a duty cycle of less than 1%.

9. The light source of claim 1, wherein the instantaneous power is more than 100 W.

10. The light source of claim 1, said light source comprising at least one optical amplifier, wherein the at least one optical amplifier comprises a gain medium and a third sub-light source for pumping said gain medium.

11. The light source of claim 10, wherein at least one of the optical amplifiers comprises a double clad fiber having a core portion formed by a rare-earth doped fiber and a cladding layer for guiding pump light, wherein said DUMP light is fed into the cladding layer in a direction opposite to the light propagating in the core portion.

12. The light source of claim 10, wherein said light source comprises two or more optical amplifiers, wherein between two optical amplifiers, a filter, in particular a laser line filter, is provided for filtering an amplified stimulated emission background.

13. The light source of claim 1, wherein said non-linear wavelength conversion step is carried out, at least in part, in an optical amplifier, wherein said second light signal is introduced into the optical amplifier prior to or during amplification in the amplifier where the wavelength conversion step takes place.

14. A method for generating coherent narrow band light comprising the following steps:
generating light having a first wavelength using a first sub-light source;
generating light having a second wavelength using a second sub-light source, said second wavelength being longer than said first wavelength; and
superposing said first and second wavelength light in an optical fiber or waveguide, thereby facilitating a non-linear wavelength conversion step involving a Raman-active medium,
wherein at least one of said first and second sub-light sources has a coherence length longer than 0.5 mm, wherein the length of said fiber or waveguide is selected such as to allow for at least two consecutive Raman wavelength shifts, and wherein the frequency shift associated with the at least two Raman shifts is a corresponding multiple of the difference between said second and first wavelengths.

15. The method of claim 14, wherein the wavelength converted light resulting from said wavelength conversion step has a coherence length longer than 0.5 mm.

16. The method of claim 14, further comprising a step of modulating light generated by the first or second sub-light source.

17. The method according to one of 14, further comprising a step of amplifying light generated by one of said first and second sub-light sources, using an amplifier comprising a gain medium and a third sub-light source for pumping said gain medium, wherein said gain medium is a rare earth doped optical fiber.

18. The method of claim 14, wherein the non-linear wavelength conversion step is carried out at least in part in an optical amplifier, wherein a light signal generated by said second sub-light source is introduced into the optical amplifier prior to or during amplification in the amplifier where at least part of the wavelength conversion step takes place.

19. The method of claim 14, wherein a light signal generated by said second sub-light source is combined with light generated by the first sub-light source prior to a final amplification stage for amplifying said light generated by said first sub-light source.

20. The light source of claim 1, wherein both of said first and second sub-light sources have a coherence length longer than 2 mm.

* * * * *

UNITED STATES PATENT AND TRADEMARK OFFICE
CERTIFICATE OF CORRECTION

PATENT NO. : 9,515,452 B2
APPLICATION NO. : 14/890093
DATED : December 6, 2016
INVENTOR(S) : Robert Alexander Huber et al.

It is certified that error appears in the above-identified patent and that said Letters Patent is hereby corrected as shown below:

In the Claims

At Column 13, Line 7, "0.05 mm." should be -- 0.5 mm. --.

At Column 13, Line 10, "of" should be -- of: --.

At Column 13, Line 13, "Fabry-Perot" should be -- Fabry-Pérot --.

At Column 13, Line 17, "modulation or" should be -- modulation, or --.

At Column 13, Line 36, "claim 1, said" should be -- claim 1, wherein said --.

At Column 13, Line 43, "DUMP" should be -- pump --.

At Column 14, Line 32, "to one of 14," should be -- to claim 14, --.

Signed and Sealed this
Sixth Day of June, 2017

Michelle K. Lee
*Director of the United States Patent and Trademark Office*